(12) United States Patent
Champagne et al.

(10) Patent No.: US 12,139,562 B2
(45) Date of Patent: Nov. 12, 2024

(54) COPOLYMER AND GRINDING OF A MINERAL MATTER

(71) Applicant: COATEX, Genay (FR)

(72) Inventors: Clementine Champagne, Caluire-et-Cuire (FR); Christian Jacquemet, Lyons (FR); Laurie Parrenin, Genay (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 912 days.

(21) Appl. No.: 17/056,263

(22) PCT Filed: Jun. 4, 2018

(86) PCT No.: PCT/FR2018/051283
§ 371 (c)(1),
(2) Date: Nov. 17, 2020

(87) PCT Pub. No.: WO2019/234310
PCT Pub. Date: Dec. 12, 2019

(65) Prior Publication Data
US 2021/0214476 A1    Jul. 15, 2021

(51) Int. Cl.
| | | |
|---|---|---|
| *C11D 3/36* | (2006.01) | |
| *C02F 5/10* | (2023.01) | |
| *C08F 120/06* | (2006.01) | |
| *C09C 1/02* | (2006.01) | |
| *C11D 3/04* | (2006.01) | |
| *C11D 3/06* | (2006.01) | |
| *C11D 3/37* | (2006.01) | |
| *C11D 3/39* | (2006.01) | |
| *C11D 7/02* | (2006.01) | |
| *C11D 7/26* | (2006.01) | |
| *C11D 17/06* | (2006.01) | |
| *D21H 17/00* | (2006.01) | |
| *D21H 17/37* | (2006.01) | |
| *D21H 17/67* | (2006.01) | |

(52) U.S. Cl.
CPC ............. *C08F 120/06* (2013.01); *C02F 5/10* (2013.01); *C09C 1/021* (2013.01); *C11D 3/042* (2013.01); *C11D 3/046* (2013.01); *C11D 3/06* (2013.01); *C11D 3/3757* (2013.01); *C11D 3/3761* (2013.01); *C11D 3/3765* (2013.01); *C11D 3/3902* (2013.01); *C11D 7/02* (2013.01); *C11D 7/265* (2013.01); *D21H 17/37* (2013.01); *D21H 17/675* (2013.01); *D21H 17/74* (2013.01); *C01P 2004/32* (2013.01); *C01P 2004/61* (2013.01); *C01P 2004/62* (2013.01); *C01P 2004/64* (2013.01)

(58) Field of Classification Search
CPC ........... C11D 3/042; C11D 3/046; C11D 3/06; C11D 3/3757; C11D 3/3761; C11D 3/3765; C11D 3/3902
USPC ......................... 510/372, 453, 475, 477, 488
See application file for complete search history.

(56) References Cited

U.S. PATENT DOCUMENTS

| | | |
|---|---|---|
| 2013/0261257 A1 | 10/2013 | Wakao et al. |
| 2015/0148500 A1 | 5/2015 | Fujiwara |
| 2017/0096505 A1 | 4/2017 | Fujiwara |

FOREIGN PATENT DOCUMENTS

| | | | |
|---|---|---|---|
| EP | 2 657 261 A1 | 10/2013 | |
| FR | 3 056 594 A1 | 3/2018 | |

OTHER PUBLICATIONS

International Search Report issued on Feb. 21, 2019 in PCT/FR2018/051283 filed on Jun. 4, 2018, 2 pages.

*Primary Examiner* — Gregory R Delcotto
(74) *Attorney, Agent, or Firm* — Oblon, McClelland, Maier & Neustadt, L.L.P.

(57) ABSTRACT

A polymer may have a molecular mass of less than 8,000 g/mol and a polymolecularity index PI of less than 3, produced by free radical polymerization, in water, and at a temperature higher than 50° C., of at least one anionic monomer comprising at least one polymerizable olefinic unsaturation and at least one carboxylic acid function, in the presence of phosphorus with a degree of oxidation I, phosphorus with a degree of oxidation III and a radical-generating compound. Such polymers may be produced and use for grinding mineral matter, as a detergent agent, or as an anti-scaling agent.

22 Claims, No Drawings

COPOLYMER AND GRINDING OF A MINERAL MATTER

CROSS-REFERENCE TO RELATED APPLICATIONS

The present application is the national stage of, and claims the benefit of, international application PCT/FR2018/051283, filed on Jun. 4, 2018.

DESCRIPTION

The invention relates to a polymer with a molecular mass of less than 8,000 g/mol and a polymolecularity index (PI) of less than 3. It is obtained by radical polymerisation in water and at a temperature greater than 50° C. of at least one anionic monomer comprising at least one polymerisable olefinic unsaturation and at least one carboxylic acid group, in the presence of phosphorus in the oxidation I state, phosphorus in the oxidation III state, and a radical-generating compound.

The invention also relates to the preparation of this polymer and to its use in grinding mineral material or as a detergent agent or as a scale-inhibiting agent.

Particularly advantageously according to the invention, the simultaneous participation of the compound comprising phosphorus in the oxidation I state and the compound comprising phosphorus in the oxidation III state in the radical polymerisation according to the invention makes it possible to obtain a polymer according to the invention with enhanced performance relative to the polymers in the prior art. In particular, the participation of the compound comprising a specific amount of phosphorus in the oxidation III state relative to the compound comprising phosphorus in the oxidation I state makes it possible to obtain a polymer according to the invention with even better performance relative to the polymers in the prior art.

There are known grinding aid agents, in particular polymers derived from unsaturated monomers comprising one or more carboxylic acid groups. These grinding aid agents generally make it possible to control the rheology of the suspension of particles of mineral material during the grinding operation. In particular, these grinding aid agents make it possible to reduce the flow limit of the suspension of mineral filler to be ground as far as possible while maintaining a sufficient viscosity level during the grinding operation.

In general, grinding aid agents for mineral material must be effective and make it possible to control the granulometry of the particles obtained, particularly for mineral material that is subsequently used in paper coating colours for the papermaking industry. Moreover, grinding aid agents for mineral material must have a high degree of efficacy in terms of grinding time for a particular particle size for a specific amount of mineral material. In fact, for the production of a specific amount of mineral particles with a particular particle size, a reduced use time of the grinding facilities improves the overall yield of the grinding method.

Likewise, it is important to have grinding aid agents for grinding mineral material that make it possible to prepare aqueous suspensions of low-viscosity particles of mineral material that are stable shortly after grinding but also several hours or days after grinding. Viscosity drift phenomena must be controlled because they can lead to gelation of the prepared suspensions which would make handling difficult or impossible. Such viscosity gaps must be the lowest possible. Likewise, particle settling phenomena must be avoided or strongly slowed.

In addition to controlling the stability, it is also essential to control the viscosity of the aqueous suspensions of ground particles of mineral material. In general, controlling the viscosity of the aqueous suspensions of ground particles of mineral material must make it possible to obtain a low viscosity level while providing a high level of concentration of the mineral material in the aqueous suspension of mineral material.

It is therefore also important to be able to prepare aqueous suspensions of particles of mineral material with a high solids content using high-performance grinding aid agents. Grinding aid agents for mineral material that make it possible to obtain a high solids content of these aqueous suspensions of particles of mineral material also make it possible to increase the productivity of the methods of preparing these suspensions.

In addition, from an environmental standpoint, it is important to be able to use grinding aid agents enabling the preparation of suspensions of particles of mineral material comprising a lower water content while maintaining or enhancing the properties of these suspensions.

Furthermore, when manufacturing coated and surface-finished paper, aqueous compositions of paper coating colours are used to deposit a coat of particles of mineral material and binder on the surface of the sheet of paper. In this way, its surface finish is modified to improve its printability, gloss, or opacity. As an example, for a coated paper used in printing, the coating is obtained using an aqueous dispersion comprised mostly of binders and pigments which are still referred to as "mineral fillers". The most frequently-used pigments in paper coating are kaolin, calcium carbonate, titanium dioxide, talcum and organic pigments, in particular plastic pigments. In these compositions, the mineral filler is in the form of particles. In particular, the use of such paper coating colours makes it possible to enhance the physical properties of the paper, particularly to improve its optical properties.

Improving the efficacy of paper-making methods is also made possible through the use of these paper coating colours.

Improving the compatibility of the different compounds used in the production of paper should also be sought.

Thus, although there are grinding aid agents for wet grinding methods for mineral material, the methods used in the prior art do not always make it possible to provide a satisfactory solution to the problems encountered. There is therefore a need for improved grinding aid agents or methods for grinding mineral material in water.

Moreover, there is also a need for washing agents that make it possible to improve the efficacy of washing methods, particularly when combined with at least one surfactant.

There is also a need for detergent or scale-inhibiting compositions comprising at least one polymer with improved efficacy, particularly in combination with at least one surfactant.

The invention makes it possible to provide a solution to all or part of the problems of the methods used in the prior art. Thus, the invention provides a polymer with a molecular mass $M_W$ (measured by SEC) of less than 8,000 g/mol and a polymolecularity index (PI) of less than 3, obtained by at least one radical polymerisation reaction in water and at a temperature greater than 50° C. of at least one anionic monomer comprising at least one polymerisable olefinic unsaturation and at least one carboxylic acid group, in the presence:
(a) of at least one compound (a) comprising phosphorus in the oxidation I state,
(b) of at least 5% by weight of at least one compound (b) comprising phosphorus in the oxidation III state, relative to the total amount by weight of compounds (a) and (b),
(c) of at least one radical-generating compound (c) chosen among hydrogen peroxide, benzoyl peroxide, acetyl peroxide, lauryl peroxide, tert-Butyl hydroperoxide, cumene hydroperoxide, ammonium persulphate, an alkaline metal persulphate, an azo compound, such as 2,2'-azobis(2-(4,5-dihydroimidazolyl) propane, 2,2'-azobis(2-methylpropionamidine) dihydrochloride, diazo-valeronitrile, 4,4'-azobis-(4-cyanovaleric) acid, AZDN or 2,2'-azobisisobutyronitrile, and combinations thereof, optionally associated with an ion chosen among $Fe^{II}$, $Fe^{III}$, $Cu^{I}$, $Cu^{II}$.

According to the invention, the amounts of compounds used, in particular compounds (a), (b) and (c), particularly compounds (a) and (b), relate to the amounts of active chemical species, including non-hydrate chemical species.

Preferably, the polymer according to the invention is prepared by a radical polymerisation reaction carried out in water. It can also be prepared in a solvent mixed with water, in particular an alcoholic solvent, particularly isopropyl alcohol. According to the invention, the radical polymerisation reaction is carried out in the absence of 1,4-dioxane, preferably in the absence of any organic solvent.

There can be a relatively broad variation in the mass of the polymer according to the invention. Preferably, the polymer according to the invention has a weight-average molecular mass $M_W$ of less than 7,500 g/mol, preferably less than 6,500 g/mol or less than 6,000 g/mol, more preferentially less than 5,500 g/mol. Also preferably, the polymer according to the invention has a weight-average molecular mass $M_W$ of more than 1,000 g/mol or of more than 1,200 g/mol or of more than 1,500 g/mol.

Particularly preferably, the polymer according to the invention has a weight-average molecular mass $M_W$ ranging from 1,000 to 8,000, 7,500, 6,500, 6,000 or 5,500 g/mol. More particularly preferably, the polymer according to the invention has a weight-average molecular mass $M_W$ ranging from 1,200 to 8,000, 7,500, 6,500, 6,000 or 5,500 g/mol. Even more particularly preferably, the polymer according to the invention has a weight-average molecular mass $M_W$ ranging from 2,000 to 8,000, 7,500, 6,500, 6,000 or 5,500 g/mol.

Particularly preferably, the polymer according to the invention has a weight-average molecular mass $M_W$ ranging from 3,500 g/mol to 5,500 or to 6,500 g/mol. Also especially particularly preferably, the polymer according to the invention has a weight-average molecular mass $M_W$ ranging from 4,500 g/mol to 5,500 or to 6,500 g/mol.

There can be a relatively broad variation in the polymolecularity index (PI) of the polymer according to the invention. Preferably, the polymolecularity index PI of the polymer according to the invention is less than 2.8. More preferably, the polymolecularity index PI of the polymer according to the invention ranges from 1.5 to 3 or from 1.5 to 2.8. Even more preferably, the polymolecularity index PI of the polymer according to the invention ranges from 1.5 to 2.5.

An essential step in the preparation of the polymer used according to the invention is the radical polymerisation reaction of at least one anionic monomer comprising at least one polymerisable olefinic unsaturation and at least one carboxylic acid group.

Preferably, the anionic monomer comprising at least one polymerisable olefinic unsaturation comprises one or two carboxylic acid groups. More preferably, it includes a single carboxylic acid group.

More preferably, the anionic monomer is chosen among acrylic acid, methacrylic acid, an acrylic acid salt, a methacrylic acid salt, and combinations thereof. Particularly preferably according to the invention, the radical polymerisation reaction only uses acrylic acid.

Also preferably, the anionic monomer comprising at least one polymerisable olefinic unsaturation and at least one carboxylic acid group is different from maleic acid.

In addition to the anionic monomer comprising at least one polymerisable olefinic unsaturation and at least one carboxylic acid group, the radical polymerisation reaction can use at least one other monomer. Preferably, the radical polymerisation reaction can then also use at least one monomer chosen among:
- another different anionic monomer chosen among acrylic acid, methacrylic acid, itaconic acid, maleic acid, their salts, and mixtures thereof,
- a non-ionic monomer comprising at least one polymerisable olefinic unsaturation, preferably at least one polymerisable ethylenic unsaturation and in particular a polymerisable vinyl group, more preferentially a non-ionic monomer chosen among styrene, vinylcaprolactam, the esters of an acid comprising at least one monocarboxylic acid group, particularly an ester of an acid chosen among acrylic acid, methacrylic acid and mixtures thereof, for example alkyl acrylate, in particular $C_1$-$C_{10}$-alkyl acrylate, preferentially $C_1$-$C_4$-alkyl acrylate, more preferentially methyl acrylate, ethyl acrylate, propyl acrylate, isobutyl acrylate, n-butyl acrylate, alkyl methacrylate, in particular $C_1$-$C_{10}$-alkyl methacrylate, preferentially $C_1$-$C_4$-alkyl methacrylate, more preferentially methyl methacrylate, ethyl methacrylate, propyl methacrylate, isobutyl methacrylate, n-butyl methacrylate, aryl acrylate, preferably phenyl acrylate, benzyl acrylate, phenoxyethyl acrylate, aryl methacrylate, preferably phenyl methacrylate, benzyl methacrylate, phenoxyethyl methacrylate, a compound of formula (I):

$$R^1\text{-}(L^1)_m\text{-}(L^2)_n\text{-}R^2 \quad (I)$$

wherein:
$R^1$ represents a polymerisable acrylate group or a polymerisable methacrylate group,
$R^2$ represents an OH group or an $OCH_3$ group,
$L^1$ and $L^2$, identical or different, independently represent an ethylene-oxy group or a propylene-oxy group and
m and n, identical or different and of which at least one is different from 0, represent a number less than or equal to 150 and their sum m+n is less than 150 and
2-acrylamido-2-methylpropanesulphonic acid, a salt of 2-acrylamido-2-methylpropanesulphonic acid, 2-(methacryloyloxy) ethanesulphonic acid, a salt of 2-(methacryloyloxy) ethanesulphonic acid, sodium methallyl sulphonate, sodium styrene sulphonate and mixtures thereof.

Preferably, this other anionic monomer is different from maleic acid.

During the polymerisation reaction, the amounts of anionic monomer comprising at least one polymerisable olefinic unsaturation and at least one carboxylic acid group can vary rather extensively. Preferably, the polymerisation reaction uses 100% by weight of this anionic monomer.

Likewise, the amounts of the other monomers can also vary rather extensively. Preferably, the polymerisation reaction can then use from 70 to 99.5% by weight of anionic monomer comprising at least one polymerisable olefinic unsaturation and a carboxylic acid group and from 0.5 to 30% by weight of at least one monomer chosen among:
 another different anionic monomer chosen among acrylic acid, methacrylic acid, itaconic acid, maleic acid, their salts, and mixtures thereof,
 a non-ionic monomer comprising at least one polymerisable olefinic unsaturation, preferably at least one polymerisable ethylenic unsaturation and in particular a polymerisable vinyl group, more preferentially a non-ionic monomer chosen among styrene, vinylcaprolactam, the esters of an acid comprising at least one monocarboxylic acid group, particularly an ester of an acid chosen among acrylic acid, methacrylic acid and mixtures thereof, for example alkyl acrylate, in particular $C_1$-$C_{10}$-alkyl acrylate, preferentially $C_1$-$C_4$-alkyl acrylate, more preferentially methyl acrylate, ethyl acrylate, propyl acrylate, isobutyl acrylate, n-butyl acrylate, alkyl methacrylate, in particular $C_1$-$C_{10}$-alkyl methacrylate, preferentially $C_1$-$C_4$-alkyl methacrylate, more preferentially methyl methacrylate, ethyl methacrylate, propyl methacrylate, isobutyl methacrylate, n-butyl methacrylate, aryl acrylate, preferably phenyl acrylate, benzyl acrylate, phenoxyethyl acrylate, aryl methacrylate, preferably phenyl methacrylate, benzyl methacrylate, phenoxyethyl methacrylate, a compound of formula (I):

$$R^1\text{-}(L^1)_m\text{-}(L^2)_n\text{-}R^2 \qquad (I)$$

wherein:
 $R^1$ represents a polymerisable acrylate group or a polymerisable methacrylate group,
 $R^2$ represents an OH group or an $OCH_3$ group,
 $L^1$ and $L^2$, identical or different, independently represent an ethylene-oxy group or a propylene-oxy group and
 m and n, identical or different and of which at least one is different from 0, represent a number less than or equal to 150 and their sum m+n is less than 150 and
2-acrylamido-2-methylpropanesulphonic acid, a salt of 2-acrylamido-2-methylpropanesulphonic acid, 2-(methacryloyloxy) ethanesulphonic acid, a salt of 2-(methacryloyloxy) ethanesulphonic acid, sodium methallyl sulphonate, sodium styrene sulphonate and mixtures thereof.

Preferably, this other anionic monomer is different from maleic acid.

Preferably, during the polymerisation reaction for the preparation of the polymer according to the invention, compound (a) is a mineral compound; it therefore comprises no covalent phosphocarbon bond. More preferably, it is hypophosphorous acid ($H_3PO_2$) or a derivative of hypophosphorous acid. Even more preferably, compound (a) is a compound comprising at least one hypophosphite ion ($H_2PO_2^-$). Compound (a) according to the invention can therefore be chosen among sodium hypophosphite ($H_2PO_2Na$), potassium hypophosphite ($H_2PO_2K$), calcium hypophosphite ($[H_2PO_2]_2Ca$) and mixtures thereof. According to the invention, the preferred compound (a) is sodium hypophosphite.

During the polymerisation reaction according to the invention, compound (a) is used in an amount of at most 95% by weight or of at most 94% by weight or of at most 92.5% by weight relative to the total amount by weight of compounds (a) and (b). Preferably, the amount by weight of compound (a) used ranges from 1 to 95% by weight, more preferentially from 50 to 95% by weight or from 70 to 95% or from 80 to 95% by weight, relative to the total weight of compounds (a) and (b). Also preferably, the amount by weight of compound (a) used ranges from 1 to 95% by weight, more preferentially from 1 to 94% by weight or from 1 to 92.5% or from 1 to 90% by weight, relative to the total weight of compounds (a) and (b). Also preferably, the amount by weight of compound (a) used ranges from 50 to 95% by weight, more preferentially from 50 to 94% by weight or from 50 to 92.5% or from 50 to 90% by weight, relative to the total weight of compounds (a) and (b). The polymerisation reaction can also be carried out in the absence of compound (a).

Preferably, during the polymerisation reaction according to the invention, compound (a) is used in an amount ranging from 0.01 to 10% by weight relative to the amount of monomers used, particularly relative to the amount of anionic monomer comprising at least one polymerisable olefinic unsaturation and at least one carboxylic acid group. More preferably according to the invention, this amount of compound (a) used ranges from 0.01 to 5 or to 6% by weight or from 0.01 to 2 or to 3% by weight, relative to the amount of monomers used.

In addition to compound (a) comprising phosphorus in the oxidation I state, the polymer preparation reaction according to the invention also uses at least 5% by weight of at least one compound (b) comprising phosphorus in the oxidation III state, relative to the total amount by weight of compounds (a) and (b).

Preferably, during the polymerisation reaction for the preparation of the polymer according to the invention, compound (b) is a mineral compound; it therefore comprises no covalent phosphocarbon bond. More preferably, it is phosphorous acid ($H_3PO_3$) or a derivative of phosphorous acid, particularly a derivative of phosphorous acid. Even more preferably, compound (b) is a compound comprising at least one hypophosphite ion ($HPO_3^{2-}$). Compound (b) according to the invention can therefore be chosen among sodium phosphite ($HPO_3Na_2$), potassium phosphite ($HPO_3K_2$), calcium phosphite ($HPO_3Ca$) and mixtures thereof, particularly sodium phosphite ($HPO_3Na_2$) and calcium phosphite ($HPO_3Ca$). According to the invention, the preferred compound (b) is chosen among sodium phosphite ($HPO_3Na_2$), calcium phosphite ($HPO_3Ca$) and mixtures thereof. According to the invention, the most preferred compound (b) is calcium phosphite ($(HPO)_3Ca$).

During the polymerisation reaction according to the invention, compound (b) is used in an amount of at least 5% by weight relative to the total amount by weight of compounds (a) and (b). Preferably, the amount by weight of compound (b) used is more than 6% by weight or more than 7.5% by weight relative to the total weight of compounds (a) and (b). Also preferably, compound (b) is used in an amount of more than 10% by weight, more than 12.5% by weight or more than 15% by weight, also preferentially more than 20% by weight, more than 25% by weight, more than 30% by weight or more than 40% by weight, relative to the total weight of compounds (a) and (b).

Also preferably, the amount by weight of compound (b) used ranges from 5 to 95% by weight, more preferentially from 5 to 50% by weight or from 5 to 30% or from 5 to 20% by weight, relative to the total weight of compounds (a) and (b).

In addition to compounds (a) and (b) comprising, respectively, phosphorus in the oxidation I state and phosphorus in the oxidation III state, the polymer preparation reaction according to the invention also uses at least one radical-generating compound (c). Preferably, compound (c) is chosen among hydrogen peroxide, ammonium persulphate, sodium persulphate, potassium persulphate, and mixtures thereof.

During the polymerisation reaction according to the invention, compound (c) is used in an amount ranging from 0.1 to 5% by weight relative to the amount by weight of anionic monomer or of monomers. Preferably, the amount of hydrogen peroxide used ranges from 0.5 to 4.5% by weight relative to the amount by weight of anionic monomer or of monomers. Also preferably, the amount of ammonium persulphate or alkaline metal persulphate used, particularly sodium persulphate or potassium persulphate, ranges from 0.1 to 4% by weight relative to the amount by weight of anionic monomer or of monomers.

When using hydrogen peroxide or a persulphate combined with an ion chosen among $Fe^{II}$, $Fe^{III}$, $Cu^{I}$, $Cu^{II}$, these ions can be injected by means of various chemical compounds. Examples of chemical compounds enabling the injection of $Fe^{II}$, $Fe^{III}$, $Cu^{I}$, and $Cu^{II}$ ions include iron sulphate, iron sulphate hydrate, iron sulphate hemihydrate, iron sulphate heptahydrate, iron carbonate, iron carbonate hydrate, iron carbonate hemihydrate, iron chloride, copper carbonate, copper carbonate hydrate, copper carbonate hemihydrate, copper acetate, copper sulphate, copper sulphate pentahydrate, copper hydroxide, and copper halide.

The polymerisation reaction for preparing the polymer according to the invention is carried out at a temperature of at least 50° C. Preferably, it can be carried out at a temperature greater than 80° C. or greater than 95° C.

Moreover, the polymerisation reaction can be carried out in the absence of a neutralisation agent, particularly in the absence of a base neutralisation agent. However, the polymer according to the invention can be neutralised, in particular after the polymerisation reaction. The polymer according to the invention can be completely or partially neutralised. According to the invention, the neutralisation of the polymer is achieved by neutralising or salifying all or part of the carbolic acid groups present in the polymer.

Preferably, this neutralisation is achieved using a base, for example using a derivative of an alkaline metal or of an alkaline-earth metal. The preferred bases are chosen among ZnO, MgO, NaOH, KOH, $NH_4OH$, $Ca(OH)_2$, $Mg(OH)_2$, monoisopropylamine, triethanolamine, triisopropylamine, 2-amino-2-methyl-1-propanol (AMP), triethylamine, diethylamine, monoethylamine. Particularly preferably, neutralisation is achieved using ZnO, MgO, NaOH, $Ca(OH)_2$, $Mg(OH)_2$, alone or in combination.

When preparing the polymer according to the invention, a separation step can also be implemented. According to the invention, the separation can be implemented after the full or partial neutralisation of the polymer according to the invention. It can also be implemented prior to neutralising the polymer.

The fully or partially neutralised aqueous polymer solution can be processed using the static or dynamic fractioning methods known as such. To do so, one or more polar solvents is used, in particular from the group comprised of methanol, ethanol, n-propanol, isopropanol, butanols, acetone, and tetrahydrofuran, thus resulting in a two-phase separation. During the separation, the least dense phase comprises the largest fraction of the polar solvent and the fraction of polymers of low molecular weight, and the densest aqueous phase comprises the fraction of polymers with the highest molecular weight. The temperature at which the polymer fraction selection is processed can influence the partition coefficient. It is typically comprised within a range of from 10° C. to 80° C., preferably from 20° C. to 60° C. During the separation, it is important to control the ratio of the amounts of dilution water and polar solvents.

When using a dynamic separation method, for example centrifugation, the ratios of the extracted fractions typically depend on the centrifugation conditions. The selection of the fraction of the polymers can also be improved by re-processing the densest aqueous phase using a new amount of polar solvent, which can be different. It can also be a mixture of polar solvents. Lastly, the liquid phase obtained after processing can be distilled to eliminate the solvent(s) used in processing.

In addition to a polymer and a method of preparing this polymer, the invention relates to a method of preparing an aqueous suspension of particles of mineral material. The suspension according to the invention comprises a water-based mixture of particles of mineral material and of at least one polymer according to the invention.

Preferably, the aqueous suspension according to the invention has a solids content in mineral material of more than 60% by weight. More preferentially, the solids content of the suspension according to the invention is greater than 70% by weight, more preferentially greater than 75% by weight or greater than 80% by weight of the suspension.

Preferably, the method according to the invention uses at least one mineral material that is synthetic or of natural origin.

Also preferably, the method according to the invention uses at least one mineral material chosen among the alkaline-earth metal carbonates, preferably calcium carbonate (natural calcium carbonate or precipitated calcium carbonate), strontium carbonate, magnesium carbonate, barium carbonate, dolomite, kaolin, titanium dioxide, talcum, lime, calcium sulphate, barium sulphate, magnesium hydroxide. More preferably, the method according to the invention uses at least one mineral material chosen among natural calcium carbonate, precipitated calcium carbonate, dolomite, kaolin, calcined kaolin, titanium dioxide, talcum, lime, magnesium hydroxide.

The method according to the invention can use a single mineral material or several mineral materials. Thus, the method according to the invention can use two or three mineral materials. In particular, the method according to the invention can use calcium carbonate and at least one other mineral material chosen among dolomite, kaolin, calcined kaolin, titanium dioxide, talcum, lime, particularly calcium carbonate and kaolin or calcium carbonate and lime. Likewise, the method according to the invention can use titanium dioxide and at least one other mineral material chosen among calcium carbonate, dolomite, kaolin, talcum, lime, in particular titanium dioxide and kaolin or titanium dioxide and lime. The method according to the invention can also use kaolin or calcined kaolin and at least one other mineral material chosen among dolomite, talcum, and lime. The method according to the invention can also use talcum and lime or talcum and dolomite.

Advantageously, the method of preparing an aqueous suspension of particles of mineral material according to the invention makes it possible to suspend different sizes of particles of mineral material. According to the invention, the particle size is measured by settling.

According to the invention, the size of the particles can be defined by their median diameter $d_{50}$ for which half by weight of a particle population is smaller in size than a given value. Thus, particles that are less than 50 µm in size are particles belonging to a population of which half by weight is less than 50 µm in diameter. Preferably, the method according to the invention relates to the preparation of particles with a size of less than 50 µm or a size that ranges from 0.05 to 50 µm.

More preferably according to the invention, the particles of mineral material have a size of less than 10 µm or less than 5 µm or less than 2 µm. More preferentially, the particles of mineral material have a size of less than 1 µm or less than 0.5 µm.

Also preferably according to the invention, at least 50% by weight of the particles have a size ranging from 0.5 to 50 µm or a size of less than 10 µm. In particular, at least 50% by weight of the particles have a size of less than 5 µm or less than 2 µm, or even less than 1 µm.

Advantageously according to the invention, at least 60% by weight of the particles have a size ranging from 0.5 to 50 µm or a size of less than 10 µm. In particular, at least 60% by weight of the particles have a size of less than 5 µm or less than 2 µm, or even less than 1 µm. Also advantageously according to the invention, at least 75% by weight of the particles have a size ranging from 0.5 to 50 µm or a size of less than 10 µm. In particular, at least 75% by weight of the particles have a size of less than 5 µm or less than 2 µm, or less than 1 µm.

Also advantageously according to the invention, at least 90% by weight of the particles have a size ranging from 0.5 to 50 µm or a size of less than 10 µm. In particular, at least 90% by weight of the particles have a size of less than 5 µm or less than 2 µm, or less than 1 µm.

According to the invention, a population of mineral particles can also be defined by an equivalent spherical diameter (ESD). Preferably according to the invention, the equivalent spherical diameter of the particles of less than 50 µm in size is equal to 50% by weight. In this case, 50% by weight of the particles are less than 50 µm in size. Also preferably according to the invention, the equivalent spherical diameter of the particles of a size ranging from 0.05 µm to 50 µm or a size of less than 50 µm is equal to 60% by weight or equal to 70% by weight or even equal to 80% by weight or even equal to 90% by weight.

More preferably according to the invention, the equivalent spherical diameter of the particles of a size of less than 10 µm is equal to 60% by weight or equal to 70% by weight or even equal to 80% by weight or even equal to 90% by weight.

Much more preferably according to the invention, the equivalent spherical diameter of the particles of a size of less than 5 µm is equal to 60% by weight or equal to 70% by weight or even equal to 80% by weight or even equal to 90% by weight.

Even more preferably according to the invention, the equivalent spherical diameter of the particles of a size of less than 2 µm is equal to 60% by weight or equal to 70% by weight or even equal to 80% by weight or even equal to 90% by weight.

Particularly preferably according to the invention, the equivalent spherical diameter of the particles of a size of less than 1 µm is equal to 60% by weight or equal to 70% by weight or equal to 80% by weight or even equal to 90% by weight.

The invention also relates to a method for preparing particles of mineral material comprising the grinding, in the presence of water, of at least one mineral material in the presence of at least one polymer according to the invention.

For the grinding method according to the invention, the polymer, mineral material and particles are defined in the same manner as the polymer, mineral material and particles defined for the method of preparing an aqueous suspension of particles of mineral material according to the invention.

Thus, the invention also relates to the use of at least one polymer according to the invention as a grinding aid agent, preferably in water, of at least one mineral material.

When using the grinding method according to the invention, the mineral material used can be in various forms, in particular in the form of coarse-sized grains from blocks or pieces of crushed mineral material.

When grinding according to the invention, the size of the grains, particularly the coarse-sized grains, of mineral material or of the pieces of mineral material used, is reduced until particles are obtained. The method according to the invention is particularly effective for controlling the size of the particles produced when grinding the mineral material.

The methods for grinding and preparing an aqueous suspension of particles of mineral material according to the invention make it possible to obtain an aqueous composition of particles of mineral material.

In particular, depending on the concentration in mineral material of the aqueous composition of particles of mineral material according to the invention, it can be used in various technical fields.

Thus, the invention provides an aqueous composition of particles of mineral material, particularly a paper coating colour, comprising crushed particles of mineral material and at least one polymer according to the invention.

Preferably, the composition according to the invention also comprises at least one admixture, in particular at least one admixture chosen among dispersing agents, anti-foaming agents, biocides, tinctures, lubricants and optical brighteners or at least one binding agent, in particular a natural binding agent such as starch or a synthetic binding agent such as latex.

In addition to grinding a mineral material, the polymer according to the invention is particularly advantageous in other technical fields.

The invention also provides a method for preparing a paper coating colour comprising the grinding, in the presence of water, of at least one mineral material in the presence of at least one polymer according to the invention.

The invention also relates to a paper production method comprising the use of an aqueous composition according to the invention.

The invention also relates to a washing method comprising the application of at least one polymer according to the invention, preferably in combination with at least one surfactant.

The invention also relates to a detergent or scale-inhibiting composition comprising at least one polymer according to the invention, preferably in combination with at least one surfactant.

The particular, advantageous or preferred characteristics of the polymer and the methods of preparing an aqueous suspension or of grinding according to the invention define other methods or compositions according to the invention which are also particular, advantageous or preferred.

The following examples illustrate the various aspects of the invention. The methods or techniques used are known or described.

Molecular Weight by Steric-Exclusion Chromatography (SEC):

The molecular weights and polymolecularity indices of the polymers obtained by radical polymerisation reaction in water, at a temperature greater than 50° C., of at least one anionic monomer comprising at least one polymerisable olefinic unsaturation and a carboxylic acid function, are measured by Steric Exclusion Chromatography.

A test portion of the polymer solution corresponding to 90 mg of dry solids content is placed in a 10 mL flask. The mobile phase, supplemented with 0.04% by weight of dimethylformamide (DMF), is added up to a total weight of 10 g. The composition of this mobile phase is as follows: $NaHCO_3$:0.05 mol/L, $NaNO_3$:0.1 mol/L, triethanolamine: 0.02 mol/L, $NaN_3$ 0.03% by mass.

The SEC chain is composed of a Waters 510 isocratic pump with a flow rate set to 0.8 mL/min, a Waters 717+ sample changer, an oven containing a Waters Ultrahydrogel Guard precolumn 6 cm long and 40 mm in inner diameter, followed by a Waters Ultrahydrogel linear column 30 cm long and 7.8 mm in inner diameter.

Detection is provided by means of a Waters 410 RI differential refractometer. The oven is heated to 60° C. and the refractometer is heated to 45° C.

The SEC device is calibrated with a series of sodium polyacrylate standards provided by Polymer Standards Service with a peak molecular weight comprised within a range of from 1,000 g/mol to 1.106 g/mol and a polymolecularity index comprised within a range of from 1.4 to 1.7, as well as with a sodium polyacrylate with a molecular weight of 5,600 g/mol and a polymolecularity index equal to 2.4. The calibration curve is linear and takes into account the correction obtained by means of the flow rate marker: dimethylformamide (DMF).

Acquisition and processing of the chromatogram are performed using PSS WinGPC Scientific software v 4.02. The chromatogram obtained is incorporated into the zone corresponding to molecular weights of more than 65 g/mol.

Grinding Technique and Particle Size Measurement:

Using a peristaltic pump, suspensions of coarse grains of mineral material prepared in the presence of a polymer according to the invention are injected into a 1.4 L Dyno Mill KDL pilot grinder containing 2,850 g of ZirPro ER 120 S ceramic beads with a diameter of from 0.6 mm to 1.0 mm. The grinding conditions are adjusted so as to obtain a suspension of particles of mineral material of the desired particle size. The necessary amount of polymer injected into the system is adjusted to achieve the desired particle size. This suspension is then characterised using a particle size measurement, a Brookfield viscosity measurement followed by a stability test. This stability test consists in measuring the Brookfield viscosity of the ground suspension after a resting time of eight days at a temperature of 25° C.±1° C.

The particle size characteristics relative to the production of particles of mineral material are determined using a SediGraph III 5120 apparatus (Micrometrics, USA). In a known manner, this method and this measuring instrument make it possible to measure the particle size distribution of the suspensions of particles of mineral material. They make it possible in particular to determine the percentage of the mass fraction of a population of mineral particles with an equivalent spherical diameter of less than 1 μm or less than 2 μm (ESD<1 μm or ESD<2 μm, both expressed in %). These measurements are carried out from a suspension of particles of diluted mineral material at a concentration of approximately 33 g of dry solids content per litre of solution of sodium polyacrylate with a molecular weight of 4,000 g/mol and a dry solids content equal to 1.6 g of dry sodium polyacrylate per litre of solution. This sample is dispersed and sonicated before measurement.

Brookfield Viscosity Measurement:

The Brookfield viscosities (mPa·s) of the suspensions of particles of mineral material prepared according to the method of the invention are measured after the grinding operation (VB0) and after eight days at rest (VB8) at 25° C.±1° C. and at a spin speed of 100 rpm using a Brookfield DVIII viscometer equipped with a suitable module, for example 2 to 5.

Example 1: Preparation of Neutralised Polymers According to the Invention

A mixture (R) of water, calcium phosphite hydrate and sodium hypophosphite hydrate is injected into a tank reactor. Then, mixture 1 (M1), mixture 2 (M2) and mixture 3 (M3) are prepared from water, acrylic acid (AA), sodium persulphate, and sodium hypophosphite hydrate. The reactor is then heated so as to reach the polymerisation temperature T (97±2° C.) and mixtures 1, 2 and 3 are simultaneously injected into the reactor. Finally, the reactor is cooled and the polymer is neutralised using an aqueous solution of sodium hydroxide at 50%, while injecting the pre-prepared neutralisation mixture (NM). Neutralisation is carried out to achieve a polymeric solution with a pH greater than 6, typically a pH of from 8 to 9. The amounts of reagents (in g), the reaction conditions, the concentration by weight of phosphite (dry/dry) relative to the total amount of phosphite and hypophosphite as well as the characteristics of the polymers (molecular mass $M_w$ and polymolecularity index (PI)) are shown in Table 1.

TABLE 1

| | | Example: | | | | | |
|---|---|---|---|---|---|---|---|
| | | 1-1 | 1-2 | 1-3 | 1-4 | 1-5 | 1-6 |
| R | Water | 326.87 | 326.87 | 790 | 790 | 790 | 326.87 |
| | $CaHPO_3$ | 2.59 | 5.18 | 15.02 | 18.00 | 23.93 | 12.94 |
| | $NaH_2PO_2$ | 2.37 | 2.11 | 12.43 | 12.41 | 12.38 | 5.26 |
| M1 | Acrylic acid | 508.41 | 508.41 | 1223.88 | 1227.04 | 1223.40 | 508.41 |
| | Water | 37.66 | 37.66 | | | | 37.66 |
| M2 | Sodium persulphate | 4.23 | 4.23 | 10.23 | 10.22 | 10.19 | 4.23 |
| | Water | 112.28 | 112.28 | 100.00 | 100.00 | 100.00 | 112.28 |
| M3 | $NaH_2PO_2$ | 21.32 | 18.95 | 37.30 | 37.25 | 37.14 | 15.79 |
| | Water | 93.9 | 93.9 | 200.0 | 200.0 | 200.0 | 93.9 |

TABLE 1-continued

|  | Example: | | | | | |
| --- | --- | --- | --- | --- | --- | --- |
|  | 1-1 | 1-2 | 1-3 | 1-4 | 1-5 | 1-6 |
| NM  NaOH at 50% in water | qsp pH 8-9 | | | | | |
| [CaHPO$_3$] (ppm) | 98,554 | 197,408 | 231,969 | 266,036 | 325,800 | 380,700 |
| Mw (g/mol) | 5,225 | 6,140 | 5,435 | 5,555 | 5,450 | 5,515 |
| PI | 2.2 | 2.4 | 2.2 | 2.3 | 2.3 | 2.3 |

It can be seen that the reaction conditions implemented according to the invention make it possible to prepare polymers whose molecular mass and polymolecularity index are well-controlled.

Polymers can be used as a natural calcium carbonate grinding aid agent.

Example 2: Grinding Calcium Carbonate with an ESD of less than 1 µM Equal to 80% by Weight Aqueous suspensions of natural calcium carbonate are prepared with a solid content by weight of 76%±1% for an ESD of less than 1 µm equal to 80% by weight. They are prepared in the presence of an amount of 1.07% by dry weight of an aqueous polymer solution, as a grinding aid, relative to the solid content in calcium carbonate used in this grinding operation in order to obtain the desired particle size. The polymer solutions have a concentration of 35%±1% in active ingredient and a pH of 8.5±0.5. The raw material used to prepare these aqueous suspensions is an aqueous suspension of coarse-grain calcium carbonate with a solids content of 75%±1% by weight. The calcium carbonate is a coarse marble (commercial name Omyacarb 10 AV Omya) from the Carrare region in Italy. The grinding conditions are adapted so as to obtain a suspension of mineral particles of which 80.0%+0.5% by weight of its population has an equivalent spherical diameter of less than 1 µm (ESD<1 µm=80.0%±0.5%).

The suspensions according to the invention are then analysed and characterised using Brookfield viscosity measurements (mPa·s) after the grinding operation (VB0), then after eight days at rest (VB8) at 25° C. The results are shown in Table 2.

TABLE 2

| Suspension | Polymer | VB0 | VB8 |
| --- | --- | --- | --- |
| S1-1 | 1-1 | 313 | 649 |
| S1-2 | 1-2 | 323 | 707 |
| S1-3 | 1-3 | 296 | 601 |
| S1-4 | 1-4 | 327 | 692 |
| S1-5 | 1-5 | 320 | 702 |
| S1-6 | 1-6 | 324 | 781 |

The use of a grinding aid agent according to the invention makes it possible to prepare low-density suspensions of ground calcium carbonate. The viscosity of these suspensions changes slowly over a period of eight days. The suspension prepared according to the invention has a lower viscosity than that of the suspensions in the prior art. It is therefore more stable during storage.

The invention claimed is:

1. A polymer, comprising, in radically polymerized form:
an anionic monomer comprising a polymerizable olefinic unsaturation and a carboxylic acid group,
wherein the polymer has a molecular weight $M_W$, measured by SEC, of less than 8,000 g/mol and a polydispersity index of less than 3,
wherein the polymer is obtained by at least one radical polymerization reaction in water and at a temperature greater than 50° C. in an environment comprising:
the anionic monomer;
a compound (a) comprising phosphorus in an oxidation state of 1;
a compound (b) comprising phosphorus in an oxidation state of 3, in at least 5 wt. %, relative to a total weight of the compound (a) and the compound (b);
a radical-generating compound (c) comprising hydrogen peroxide, benzoyl peroxide, acetyl peroxide, lauryl peroxide, tert-butyl hydroperoxide, cumene hydroperoxide, ammonium persulfate, an alkaline metal persulfate, and/or an azo compound, optionally comprising an $Fe^{II}$, $Fe^{III}$, $Cu^{I}$, and/or $Cu^{II}$ ion, wherein the polymer is capable, when grinding $CaCO_3$, to provide a $VB_0/VB_8$ ratio, between a first Brookfield viscosity in mPa·s at a time immediately after a grinding operation, $VB_0$, then a second Brookfield viscosity in mPa·s after eight days at rest at 25° C., $VB8$, in a range of from 0.415 to 0.493.

2. The polymer of claim 1, wherein the weight-average molecular mass $M_W$ is less than 7,500 g/mol, or
wherein the weight-average molecular mass $M_W$ is greater than 1,000 g/mol, or
wherein the dispersity index is less than 2.8.

3. The polymer of claim 1, wherein the anionic monomer comprises one or two carboxylic acid groups.

4. The polymer of claim 1, wherein the compound (a) is a mineral compound or is hypophosphorous acid ($H_3PO_2$) or a derivative of hypophosphorous acid.

5. The polymer of claim 1, wherein the compound (a) is present in an amount of at most 95 wt. %, relative to the total weight of compounds (a) and (b), or
wherein the compound (a) is present in a range of from 0.01 to 10 wt. % relative to the amount of monomer.

6. The polymer of claim 1, wherein the compound (b) is a mineral compound or is phosphorous acid ($H_3PO_3$) or a derivative of phosphorous acid.

7. The polymer of claim 1, wherein the compound (b) is present in more than 6 wt. %, relative to the total weight of compounds (a) and (b).

8. The polymer of claim 1, wherein the radical-generating compound (c) comprises hydrogen peroxide, ammonium persulfate, sodium persulfate, and/or potassium persulfate.

9. The polymer of claim 1, wherein the radical-generating compound (c) is present in a range of from 0.1 to 5 wt. %, relative to the weight of monomer.

10. The polymer of claim 1, wherein the polymerization reaction is carried out in the absence of a base neutralization agent.

11. The polymer of claim 1, further comprising, in polymerized form:
   a further anionic monomer comprising acrylic acid, methacrylic acid, itaconic acid, and/or maleic acid, optionally as a salt; and/or
   a non-ionic monomer comprising a polymerizable olefinic unsaturation.

12. The polymer of claim 1, comprising, as polymerized monomers:
   100 wt. % of the anionic monomer; or
   the anionic monomer in 70 to 99.5 wt. % and a second monomer in a range of from 0.5 to 30 wt. %, the second monomer differing from the anionic monomer and comprising acrylic acid, methacrylic acid, itaconic acid, and/or maleic acid, optionally in salt form.

13. A method for preparing an aqueous suspension of particles of mineral material, the method comprising:
   mixing in water components comprising mineral material particles and the polymer of claim 1.

14. A method for preparing particles of mineral material, the method comprising:
   grinding, in the presence of water, components comprising a mineral material and the polymer of claim 1.

15. The method of claim 13, wherein the particles have a size of less than 50 μm, or
   wherein an equivalent spherical diameter of the particles is in a range of from 0.05 μm to 50 μm.

16. The method of claim 13, wherein a single mineral material is used, or
   wherein the mineral material comprises alkaline-earth metal carbonate, dolomite, kaolin, titanium dioxide, talcum, lime, calcium sulfate, barium sulfate, and/or magnesium hydroxide.

17. An aqueous composition, comprising:
   particles of ground mineral material; and
   the polymer of claim 1.

18. The composition of claim 17, further comprising:
   an admixture.

19. A method of producing paper, the method comprising:
   contacting the composition of claim 17 with a paper precursor.

20. A washing method, comprising:
   applying the polymer of claim 1 to an object to be washed.

21. A detergent or scale-inhibiting composition, comprising:
   the polymer of claim 1.

22. The polymer of claim 1, wherein the anionic monomer comprises acrylic acid and/or methacrylic acid, optionally in salt form,
   wherein the compound (a) is hypophosphorous acid ($H_3PO_2$) or a derivative of hypophosphorous acid, and
   wherein the compound (b) is phosphorous acid ($H_3PO_3$) or a derivative of phosphorous acid.

* * * * *